(12) United States Patent
Liang et al.

(10) Patent No.: US 10,312,552 B2
(45) Date of Patent: Jun. 4, 2019

(54) ELECTRICAL ENERGY STORAGE DEVICE AND ELECTRICITY CONDUCTING MECHANISM THEREOF

(71) Applicant: YARAY INTERNATIONAL CORPORATION, Tainan (TW)

(72) Inventors: Che-Peng Liang, Kaohsiung (TW); Yi-Ru Chen, New Taipei (TW)

(73) Assignee: YARAY INTERNATIONAL CORPORATION, Tainan (TW)

( * ) Notice: Subject to any disclaimer, the term of this patent is extended or adjusted under 35 U.S.C. 154(b) by 420 days.

(21) Appl. No.: 15/342,129

(22) Filed: Nov. 3, 2016

(65) Prior Publication Data

US 2017/0256827 A1    Sep. 7, 2017

Related U.S. Application Data

(60) Provisional application No. 62/304,337, filed on Mar. 7, 2016.

(30) Foreign Application Priority Data

Jun. 17, 2016  (TW) .............................. 105119053 A

(51) Int. Cl.
| | |
|---|---|
| *H01M 14/00* | (2006.01) |
| *H01M 10/42* | (2006.01) |
| *H02J 7/00* | (2006.01) |
| *H01G 11/76* | (2013.01) |
| *H01G 11/82* | (2013.01) |
| *H01M 2/10* | (2006.01) |

(Continued)

(52) U.S. Cl.
CPC ........ *H01M 10/4257* (2013.01); *H01G 11/76* (2013.01); *H01G 11/82* (2013.01); *H01M 2/1016* (2013.01); *H01M 2/202* (2013.01); *H01M 10/425* (2013.01); *H01M 10/482* (2013.01); *H02J 7/0014* (2013.01); *H02J 7/0042* (2013.01); *H01M 2010/4271* (2013.01); *Y02E 60/13* (2013.01)

(58) Field of Classification Search
CPC ........... H01M 10/4257; H01M 10/425; H01M 10/482; H01M 2/1016; H01M 2/202; H01M 2010/4271
See application file for complete search history.

(56) References Cited

FOREIGN PATENT DOCUMENTS

| CN | 2793930 Y | 7/2006 |
|---|---|---|
| CN | 102214718 A | 10/2011 |
| CN | 202474891 U | 10/2012 |

(Continued)

*Primary Examiner* — Jane J Rhee
(74) *Attorney, Agent, or Firm* — Cooper Legal Group, LLC

(57) ABSTRACT

An electrical energy storage device includes a casing, an input terminal set, an output terminal set, a protection circuit board, and an electricity conducting mechanism. At least one electrical energy storage unit is disposed inside the casing. The input terminal set is disposed on a side of the casing, and the output terminal set is disposed on the other side of the casing to connect with the input terminal set of another electrical energy storage device. The protection circuit board is electrically connected to the power storage unit. Two ends of the electricity conducting mechanism are respectively connected with the input terminal set and the output terminal set, and the input terminal set and the output terminal set are connected with the electrical energy storage unit via the electricity conducting mechanism and the protection circuit board.

21 Claims, 8 Drawing Sheets

(51) Int. Cl.
*H01M 2/20* (2006.01)
*H01M 10/48* (2006.01)

(56) References Cited

FOREIGN PATENT DOCUMENTS

| | | |
|---|---|---|
| CN | 103594864 A | 2/2014 |
| DE | 102014214996 A1 | 2/2016 |
| TW | M432190 U1 | 6/2012 |
| TW | M450131 U1 | 4/2013 |
| TW | M490129 U | 11/2014 |
| TW | M490681 U | 11/2014 |
| TW | M543501 U | 6/2017 |

ELECTRICAL ENERGY STORAGE DEVICE AND ELECTRICITY CONDUCTING MECHANISM THEREOF

CROSS REFERENCE TO RELATED APPLICATIONS

This application claims the benefit of U.S. provisional application Ser. No. 62/304,337, filed on Mar. 7, 2016. The entire contents of these related applications are incorporated herein by reference.

BACKGROUND OF THE INVENTION

1. Field of the Invention

The present invention disclosure relates to an electrical energy storage device and an electricity conducting mechanism thereof. More particularly, the present disclosure relates to an electrical energy storage device which could be connected in a series and/or parallel manner with another same electrical energy storage device to provide physically dynamic balancing route for the conducted electricity. Such an electrical energy storage device has longer service life and wider application field due to the dynamic auto-balancing voltage in any mode including a normal mode, a charging mode, a discharging mode, and a charging-discharging mode.

2. Description of the Prior Art

Referring to FIG. 1, a typical rechargeable battery 10 includes an input terminal 14 and an output terminal 16 disposed respectively on two ends of a casing 12. The input terminal 14 and the output terminal are electrically connected to an electrical energy storing component 18. Two rechargeable batteries 10 could be connected with each other in series connection or in parallel connection to form a battery assembly which is then recharged by an external power device. The rechargeable battery 10 with lowest voltage or worst quality will be firstly recharged in a very short time period and the other rechargeable battery 10 will be subsequently recharged in accordance with the nature of physics. The sudden huge volume of the electricity input continually degrades and damages these rechargeable batteries 10 and shortens the service lives and its integral efficacy till the battery assembly is destroyed. The battery assembly could also be destroyed in a discharged mode due to the same reason. To eliminate such defect, the battery assembly may have an extra central controller disposed inside the battery assembly to detect inward and/or outward voltages and currents of each rechargeable battery 10. However, such an extra central controller must have complicated circuits and therefore is expensive, and the central controller easily lose efficacy due to the increasing circuitry complexity when an amount of the rechargeable battery 10 in the battery assembly increases. As a result, the battery assembly still has risks of losing efficacy and reduced service life and results in danger.

SUMMARY OF THE INVENTION

The present disclosure provides an electricity conducting mechanism of an electrical energy storage device having a casing with an input terminal set and an output terminal set at two opposite sides, which is provided inside with a protection circuit board to perform function of controlling voltages thereof, and is provided inside with at least one electrical energy storage unit electrically connected to the protection circuit board. The electricity conducting mechanism includes a first clamping male terminal disposed in the input terminal set, a second clamping female terminal disposed in the output terminal set, and a conductive component having two opposite ends extended into the input terminal set and the output terminal set and therefore respectively connected to the first clamping male terminal and the second clamping female terminal. Structures of the first clamping male terminal and the second clamping female terminal are shaped to fitly engage with each other. The conductive component is connected to the electrical energy storage unit via the protection circuit board. When two of the electrical energy storage devices are connected, the first clamping male terminal of one of the electrical energy storage devices is engaged with the second terminal of the other of the electrical energy storage devices, and the electricity conducting mechanism performs function of dynamic voltage auto-balancing based on physical flow of voltages until voltages of all the electrical energy storage devices reach a constant value. Voltage difference between the electricity conducting mechanism and the electrical energy storage unit and the current volumes are detected and controlled by the protection circuit board.

According to the claimed disclosure, the first clamping male terminal disposed in the input terminal set receives a power signal and directly transmits a received power signal to the second clamping female terminal disposed in the output terminal set via the conductive component. The conductive component, the first clamping male terminal and the second clamping female terminal have high heat durability, high electrical conductivity and high power conductivity. An amount, a length, a width and a thickness of the conductive component, the first clamping male terminal and the second clamping female terminal are defined in accordance with the amount of the electrical energy storage unit inside the electrical energy storage device and the amount of the electrical energy storage device in connection. When more than two of the electrical energy storage devices are connected, the electricity conducting mechanism performs to distribute dynamically corresponding voltages and currents from ones of the electrical energy storage devices to other electrical energy storage devices based on the power signals transmitted among the electrical energy storage devices via the control of the protection circuit board.

According to the claimed disclosure, the second clamping female terminal includes a bottom portion, a clamping portion and an inclined guiding portion. The clamping portion has one end connected to the bottom portion, is adapted to press against a corresponding first clamping male terminal in an area contacting manner. The clamping portion has a structure selected from a group consisting of a sheet-typed structure, a pillar-typed structure and other more structures. The inclined guiding portion is connected to the other end of the clamping portion and adapted to guide the corresponding first clamping male terminal to contact against the clamping portion. The second clamping female terminal has a letter Y-like structure, the bottom portion is a rear part of the letter Y-like structure, the inclined guiding portion is a front part of the letter Y-like structure, and the clamping portion is a middle part of the letter Y-like structure.

According to the claimed disclosure, an electrical energy storage device includes a casing, an input terminal set disposed on one side of the casing, an output terminal set disposed on the other side of the casing, at least one electrical energy storage unit provided inside the casing, a protection circuit board provided inside the casing to perform at least voltage control function, an electricity conducting mechanism and a conductive component. The electricity conducting mechanism includes a first clamping male terminal disposed in the input terminal set, and a second clamping female terminal disposed in the output terminal set. Structures of the first clamping male terminal and the second clamping female terminal are shaped to fitly engage with each other. The conductive component has two opposite ends extended into the input terminal set and the output terminal set and therefore respectively connected to the first clamping male terminal and the second clamping female terminal. The conductive component is connected to the electrical energy storage unit via the protection circuit board. When two of electrical energy storage devices are connected, the first clamping male terminal of one of the electrical energy storage devices is engaged with the second terminal of the other of the electrical energy storage devices, and the electricity conducting mechanism performs function of dynamic voltage auto-balancing based on physical flow of voltages until voltages of all the electrical energy storage devices reach a constant value, and voltage difference between the electricity conducting mechanism and the electrical energy storage unit and current volumes are detected and controlled by the protection circuit board.

The electricity conducting mechanism of the present disclosure is a new conducting mechanism provided with the area contacting terminal having letter Y-like shape and other related electricity conducting module. The electricity conducting mechanism performs function of dynamic voltage auto-balancing of power signals (or conducted currents) transmitted freely fast between the electrical energy storage devices from a high voltage level to a low voltage level at all times no matter what situation the assembly of the electrical energy storage devices are, such like including charge/discharge, charge, discharge, non-charge/non-discharge, and in series/parallel connection with other energy storage devices. The function of dynamic voltage auto-balancing is automatically actuated in a short time since the electrical energy storage devices are connected with each other to be integrated and therefore may act as a single battery. Compared with the typical energy storage device, the electrical energy storage device utilizes the electricity conducting mechanism rather than an expensive electronic central controller to balance the voltages/currents among the plurality of electrical energy storage devices. Even when an extra electrical energy storage device is further connected to an existing energy storage assembly, the function of dynamic voltage auto-balancing automatically actuates between the extra electrical energy storage device and the existing energy storage assembly by means of the direct current guiding channel established by the electricity conducting mechanism, and all of the electrical energy storage devices of the newly assembled energy storage assembly connected in series and/or in parallel rapidly reach a voltage and electricity balanced status as a single large scale battery.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
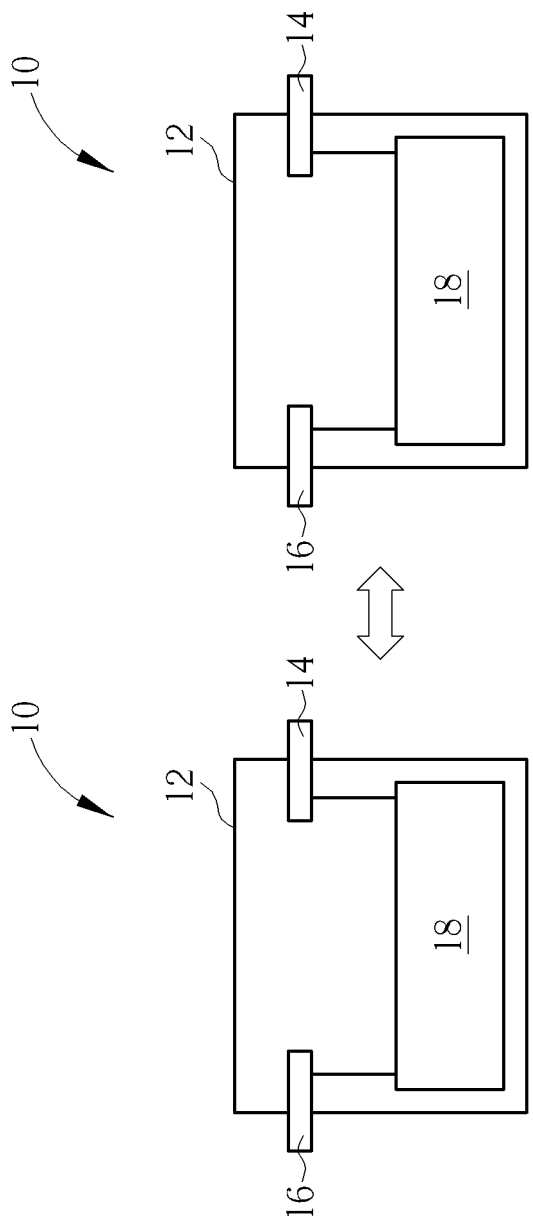
FIG. 1 is a diagram illustrating a typical rechargeable battery.
Figure 2:
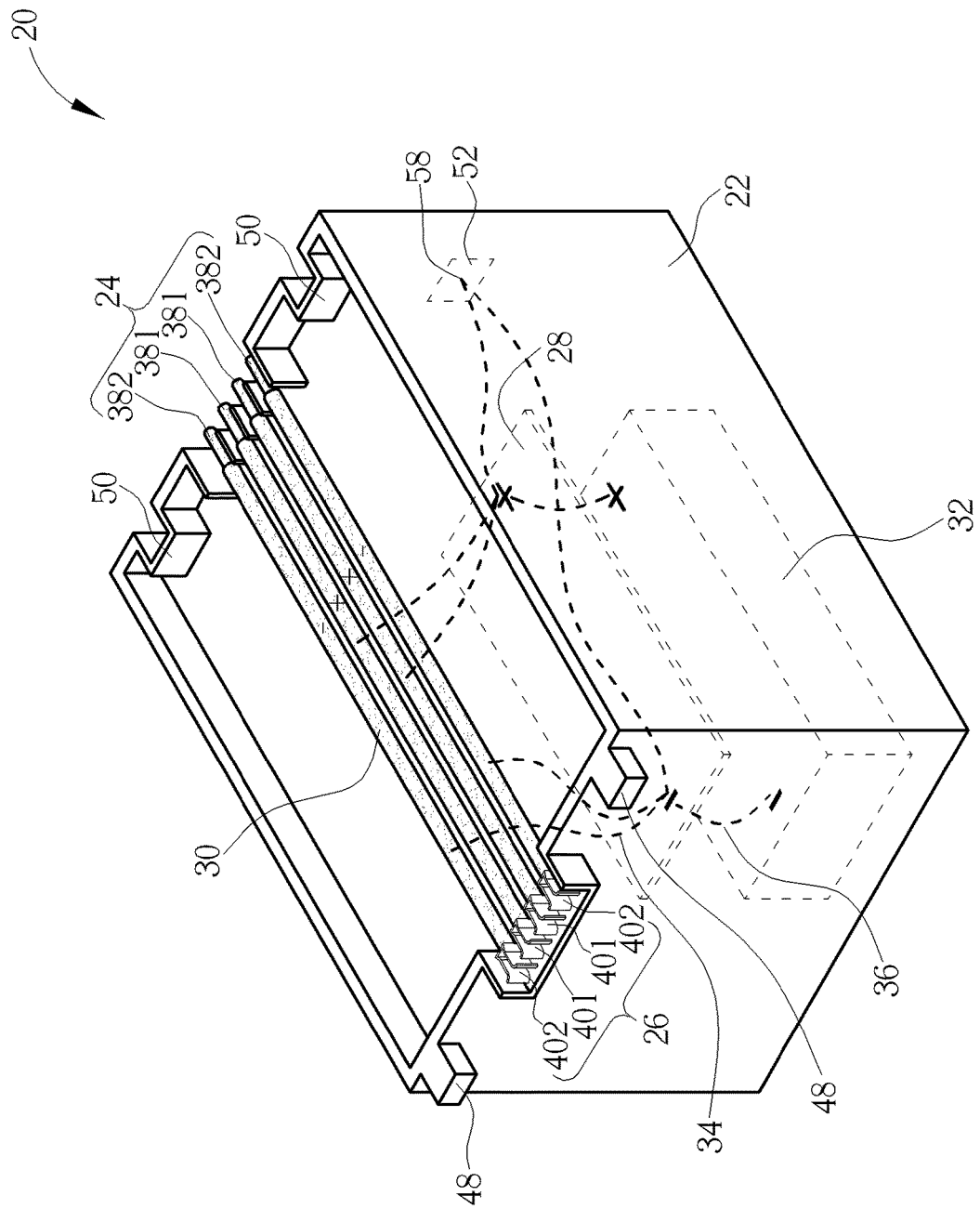
FIG. 2 is a diagram illustrating an appearance of an electrical energy storage device having ability of dynamic voltage auto-balancing according to an embodiment of the present disclosure.
Figure 3:
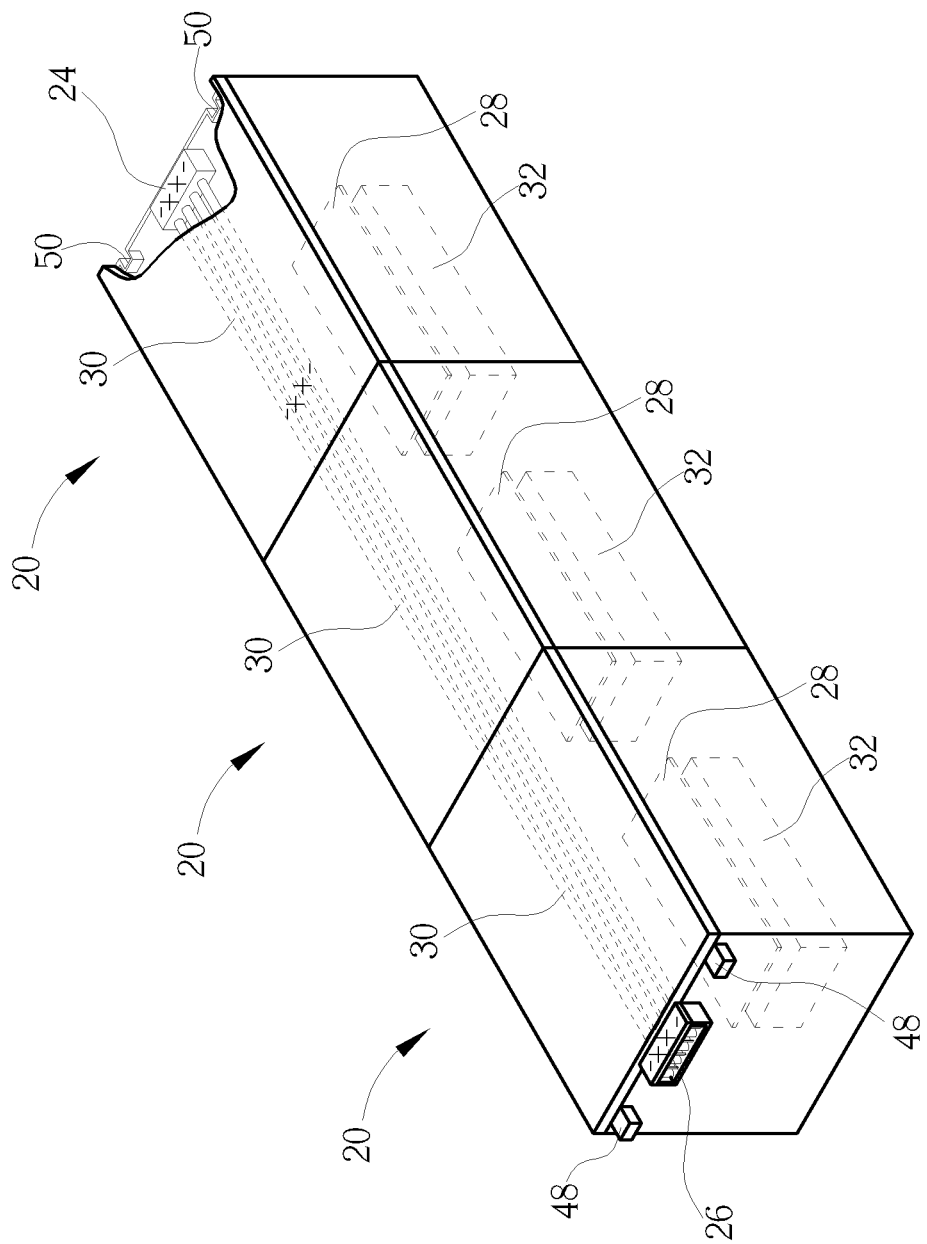
FIG. 3 is a diagram illustrating an assembly of a plurality of electrical energy storage devices of FIG. 2 in parallel connection according to the embodiment of the present disclosure.
Figure 4:
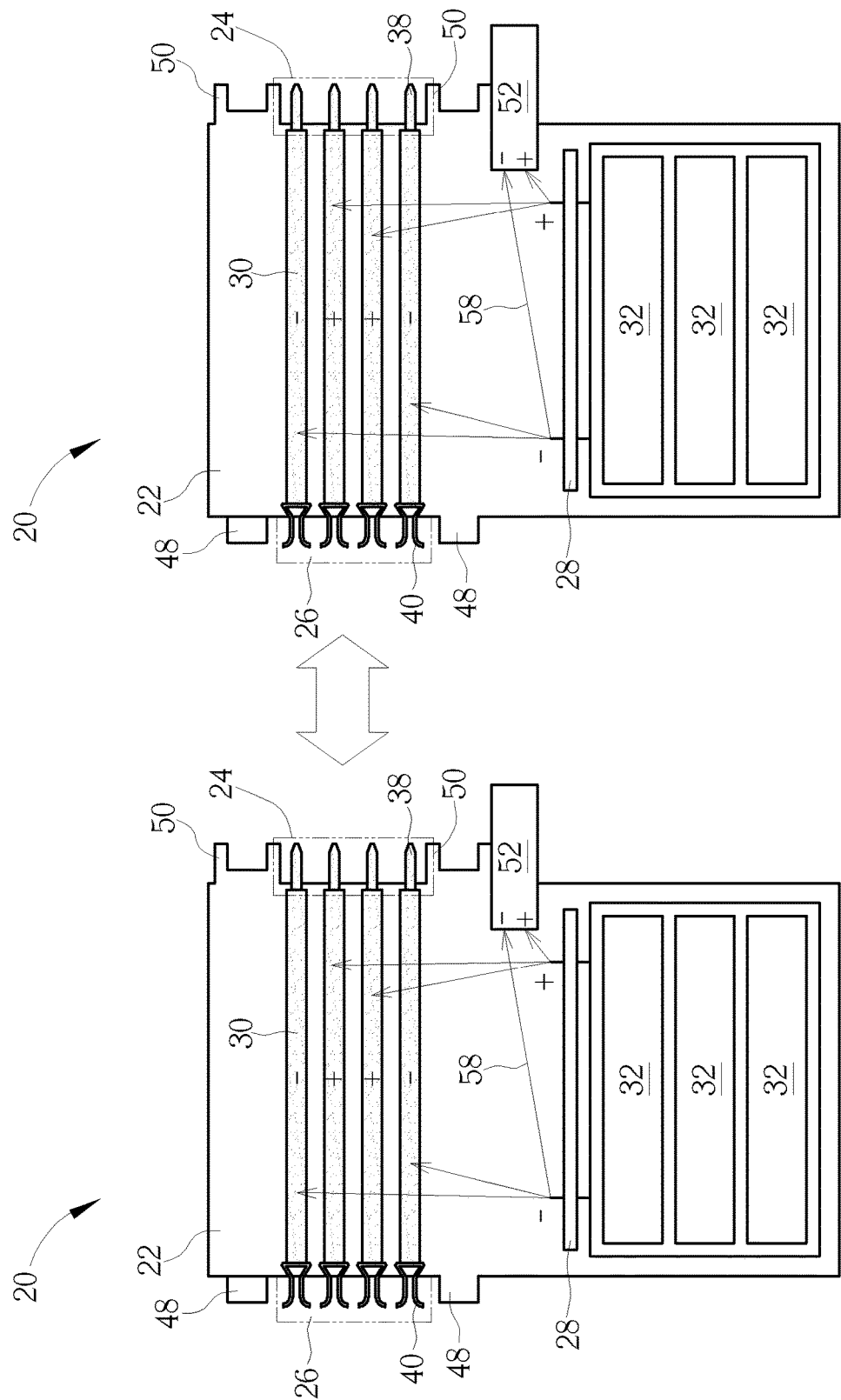
FIG. 4 is a diagram illustrating inner structures of two electrical energy storage devices of the assembly of FIG. 3 according to the embodiment of the present disclosure.

Referring to FIG. 2 to FIG. 4, an electrical energy storage device 20, which has ability of dynamic voltage auto-balancing, includes a casing 22, an input terminal set 24 having a plurality of first clamping male terminals 38, an output terminal set 26 having a plurality of second clamping female terminals 40, a protection circuit board 28 and an electricity conducting mechanism 30. The first clamping male terminal 38 may be a male terminal while the second clamping female terminal 40 may be a female terminal, or may be in other arrangement.

Specifically, the casing 22 is a receptacle of any kind, hard and/or soft materials. The electrical energy storage device 20 may be provided without the casing 22. The electricity conducting mechanism 30 is directly disposed between the input terminal set 24 and the output terminal set 26 and further connected to the protection circuit board 28 and at least one electrical energy storage unit 32 disposed inside the casing 22. The electrical energy storage device 20 may contain a single cell battery or a multi-cell battery on account of the amount and the connection way (including in-series and/or in-parallel) of the electrical energy storage unit 32. The plurality of first clamping male terminals 38 assembled with the input terminal set 24 and the plurality of second clamping female terminals 40 assembled with the output terminal set 26 are respectively disposed on opposite sides of the casing 22. Any two of the electrical energy storage device 20 can be easily connected with each other in a way like combination of building blocks by engaging the plurality of first clamping male terminals 38 of one electrical energy storage device 20 with the plurality of second clamping female terminals 40 of the other electrical energy storage device 20.

In other embodiments, the plurality of second clamping female terminals 40 may be disposed inside the input terminal set 24 and the plurality of first clamping male terminals 38 may be disposed inside the output terminal set 26. Arrangement of the plurality of first clamping male terminals 38 and the plurality of second clamping female terminals 40 is not limited to the present disclosure. The protection circuit board 28 is disposed inside the casing 22.

An end of the protection circuit board 28 is electrically connected to the electricity conducting mechanism 30 via a first transmission cable 34, and the other end of the protection circuit board 28 is electrically connected to the electrical energy storage unit 32 via a second transmission cable 36. Two ends of the electricity conducting mechanism 30 are respectively connected to the input terminal set 24 and the output terminal set 26. The plurality of first clamping male terminals 38 inside the input terminal set 24 and the plurality of second clamping female terminals 40 inside the output terminal set 26 are electrically connected to the electricity conducting mechanism 30 and the protection circuit board 28 via the first transmission cable 34, and further electrically connected to the electrical energy storage unit 32 via the second transmission cable 36 with a voltage control function of the protection circuit board 28. Meantime, the plurality of the first clamping male terminals 38 is accommodated inside the input terminal set 24, and the input terminal set 24 may be structured as a recess of the casing 22 to prevent a user from accidently touching the plurality of first clamping male terminals 38 and therefore being electrically shocked. The plurality of second clamping female terminals 40 is accommodated inside the output terminal set 26, and the output terminal set 26 may be structured as a protruding cover formed on a side surface of the casing 22. The input terminal set 24 may be utilized to further accommodate the output terminal set 26 of the other electrical energy storage device 20 and therefore receive the plurality of second clamping female terminals 40 inside the output terminal set 26 when two electrical energy storage devices 20 are assembled together.

The plurality of first clamping male terminals 38 inside the input terminal set 24 may include several electrically positive terminals 381 and several electrically negative terminals 382. The plurality of second clamping female terminals 40 inside the output terminal set 26 may include several electrically positive terminals 401 and several electrically negative terminals 402. An amount of the electricity conducting mechanism 30 bridged between the input terminal set 24 and the output terminal set 26 is not limited in the present disclosure. For example, an electrical energy storage device 20 may have six or eight or even more electricity conducting mechanisms 30 to distribute the current flow and therefore enable efficient heat dissipation. An amount of the electrically positive terminals 381 and electrically negative terminals 382 inside the input terminal set 24, and/or the electrically positive terminals 401 and electrically negative terminals 402 inside the output terminal set 26 may be varied correspondingly in accordance with the amount of the electricity conducting mechanism 30.

In one embodiment, while the electrical energy storage device 20 is in a charging mode, an electrical current from an external power device is firstly received by the plurality of first clamping male terminals 38 inside the input terminal set 24 and simultaneously transmitted to the plurality of second clamping female terminals 40 inside the output terminal set 26 through the electricity conducting mechanism 30, and/or to the electrical energy storage unit 32 through the voltage control function of the protection circuit board 28. In other words, the electrical current from the external power device is not merely transmitted to the electrical energy storage unit 32. Therefore, when a plurality of electrical energy storage devices 20 are connected with each other in series and/or in parallel in the charging mode, the electrical current transmitted from the external power device into these electrical energy storage devices 20 not only flows into an electrical energy storage device 20 having the lowest voltage but also actively flows into other electrical energy storage devices 20 having comparatively lower voltages than that of the electricity conducting mechanism 30. The electricity conducting mechanism 30 establishes a direct current guiding channel to automatically and rapidly transmit current flow from the electrical energy storage device 20 having higher voltage to the electrical energy storage device 20 having lower voltage, and performs the function of dynamic voltage auto-balancing. In other words, any voltage difference between that of the electricity conducting mechanism 30 and that of any one of the electrical energy storage devices 20 activates the function of dynamic voltage auto-balancing among all the electrical energy storage devices 20 till the overall voltages reaches a stable status. When a plurality of electrical energy storage devices 20 are connected with each other in series and/or in parallel in a discharging mode, the function of dynamic voltage auto-balancing among all electrical energy storage devices 20 performs the same principle and a detailed description is omitted herein for simplicity.

In one embodiment, the protection circuit board 28 inside the electrical energy storage device 20 may perform maximal cut-off voltage/current in the charging mode and minimum voltage/current limit in the discharging mode, so as to control the voltage and current thereof and therefore protect the electrical energy storage device 20 from being degraded. As soon as the protection circuit board 28 detects that a voltage of the electrical energy storage unit 32 is lower than a voltage of the electricity conducting mechanism 30, the electrical energy storage unit 32 is charged with a limit below 0.5C until a preset maximal cut-off is reached. On the other hand, the electrical energy storage unit 32 is discharged with a limit below 2C as soon as the protection circuit board 28 detects that a voltage of the electrical energy storage unit 32 is higher than a voltage of the electricity conducting mechanism 30 until a preset output limit is reached. The said symbol C is the capacity of the battery and commonly referred as a rate to define the volume of the charging/discharging current in one hour. In other embodiments, the charging and/or discharging limits may have other thresholds depending on various demands.

The electricity conducting mechanism 30 preferably has great electrical conductivity to effectively conduct the voltage/current flow to perform the function of dynamic voltage auto-balancing in the charging and discharging modes. The electricity conducting mechanism 30 may be made of a metal material plated by silver in one embodiment and of other materials and plating with high electrical conductivity in other embodiments. The electricity conducting mechanism 30 may include a conductive component 31 disposed between a first clamping male terminal 38 inside the input terminal set 24 and a second clamping female terminal 40 inside the output terminal set 26 to guide the voltage/current transmitted between the first clamping male terminal 38 and the second clamping female terminal 40 and thus establishes a direct voltage/current guiding channel. All these direct voltage/current guiding channels perform in physics way to balance voltage/current inside a plurality of the electrical energy storage devices 20 in connection, instead of prior charging and/or discharging only toward the electrical energy storage device 20 which has lowest voltage or worst quality. When the plurality of electrical energy storage devices 20 are connected with each other to form an electrical energy storage assembly, each electrical energy storage device 20 has ability to automatically receive or offer a corresponding electrical current in accordance with voltage difference between itself and the whole electrical energy storage assembly by means of the electricity conducting mechanism 30. In other words, the electricity conducting mechanism 30 is able to transmit corresponding power signals in a dynamic voltage auto-balancing manner to every electrical energy storage device 20 so that the voltage/current of each electrical energy storage device 20 in the electrical energy storage assembly can flow actively and finally reach a stable state within a specific voltage range. The electrical energy storage device 20 in the present disclosure has advantages of increasing service life, increasing voltage level, expanding storage capacity and can be used for any DC energy storage system.

Moreover, the electricity conducting mechanism 30 not only effectively balances and stabilizes the voltages between the plurality of electrical energy storage devices 20 connected in series and/or in parallel, but also avoids overheating of the electrical components of each of the electrical energy storage devices 20. As a result, an expensive water cooling or air cooling system could be unnecessary.

In one embodiment the electricity conducting mechanism 30 is preferably made of metal material with high heat durability, high electrical conductivity and high power conductivity to enhance safety of the whole electrical energy storage assembly especially in case for loading a higher current flow in a bigger plurality of electrical energy storage devices 20 connected in series and/or in parallel. An amount, a length, a width and a thickness of the electricity conducting mechanism 30 may be varied and defined in accordance with the following factors: a predetermined electricity in demand, an amount of the electrical energy storage unit 32 built-in the electrical energy storage device 20, an amount of the electrical energy storage device 20 in an electrical energy storage assembly, and a maximal current limit preset by the protection circuit board 28 for the charging and discharging control. For safety consideration, a current volume during discharging is preferably smaller than, but not limited to, 200 ampere (AMP).

The electrical energy storage capacity of the electrical energy storage device 20 is varied according to the amount and specification of the electrical energy storage unit 32, and therefore a plurality of electrical energy storage device 20 could be assembled to provide electrical power to any type of electrical devices. The larger power supply these electrical devices need, the more the plurality of electrical energy storage devices 20 are to be assembled. In a case of having a plurality of electrical energy storage units 32 accommodated in an electrical energy storage device 20, an internal impedance coefficient of each electrical energy storage unit 32 is preferably limited within a specific range. Not only the plurality of electrical energy storage units 32 in the same electrical energy storage device 20 preferably have similar impedances limited within the specific range, but also the electrical energy storage units 32 in the different electrical energy storage devices 20 preferably have similar internal impedances within the specific range so as to ensure safety and stability of the electrical energy storage assembly for charging and discharging function.

In one embodiment, the electrical energy storage device 20 may further include a first transmission cable 34 connected between the electricity conducting mechanism 30 and the protection circuit board 28, and a second transmission cable 36 connected between the protection circuit board 28 and the electrical energy storage unit 32. The first transmission cable 34 is independent of the second transmission cable 36. The second transmission cable 36 may have two unidirectional sub-wires respectively for unidirectional charging function and unidirectional discharging function, such that overheating of the second transmission cable 36 could be avoided. In other words, the two unidirectional sub-wires are used to avoid current reflux and protect service life of the electrical energy storage device 20. In a scenario where the electrical energy storage device 20 is Lithium battery and the second transmission cable 36 is a single wire for both charging and discharging function, it is preferable that the protection circuit board 28 actuates charging and discharging protection within 30 milliseconds and more preferably within 6 milliseconds with a maximal charging electricity not exceeding 0.5C until the electrical energy storage unit 32 is full charged to a preset maximal cut-off, and a discharging electricity not exceeding 2C until the electrical energy storage unit 32 is electrically discharged to a preset discharging limit. In other embodiments, the maximal charging and/or discharging current may be limited to have other thresholds depending on various demands.

Referring to FIG. 2 to FIG. 5, a first clamping male terminal 38 and a corresponding second clamping female terminal 40 of an electrical energy storage device 20 are respectively disposed on two opposite ends of a conductive component 31. The first clamping male terminal 38 and the second clamping female terminal 40 can be fixed on or detachably disposed on the conductive component 31, or the first clamping male terminal 38 and the second clamping female terminal 40 are connected to the conductive component 31 to form an integrated electricity conducting mechanism 30. A plurality of electricity conducting mechanisms 30 may be assembled with other components to form an electricity conducting module for in-parallel connection 56. The electricity conducting module for in-parallel connection 56 may act as parallel cable to establish a parallel connection of the electrical energy storage devices 20. The first clamping male terminal 38 may have a planar structure, a sheet-like structure, a circular structure, a slab-like structure, a pillar-like structure or any other structures. The second clamping female terminal 40 may have a letter Y-like clamper having a clamping portion being shaped to fitly receive the first clamping male terminal 38.

Figure 6:
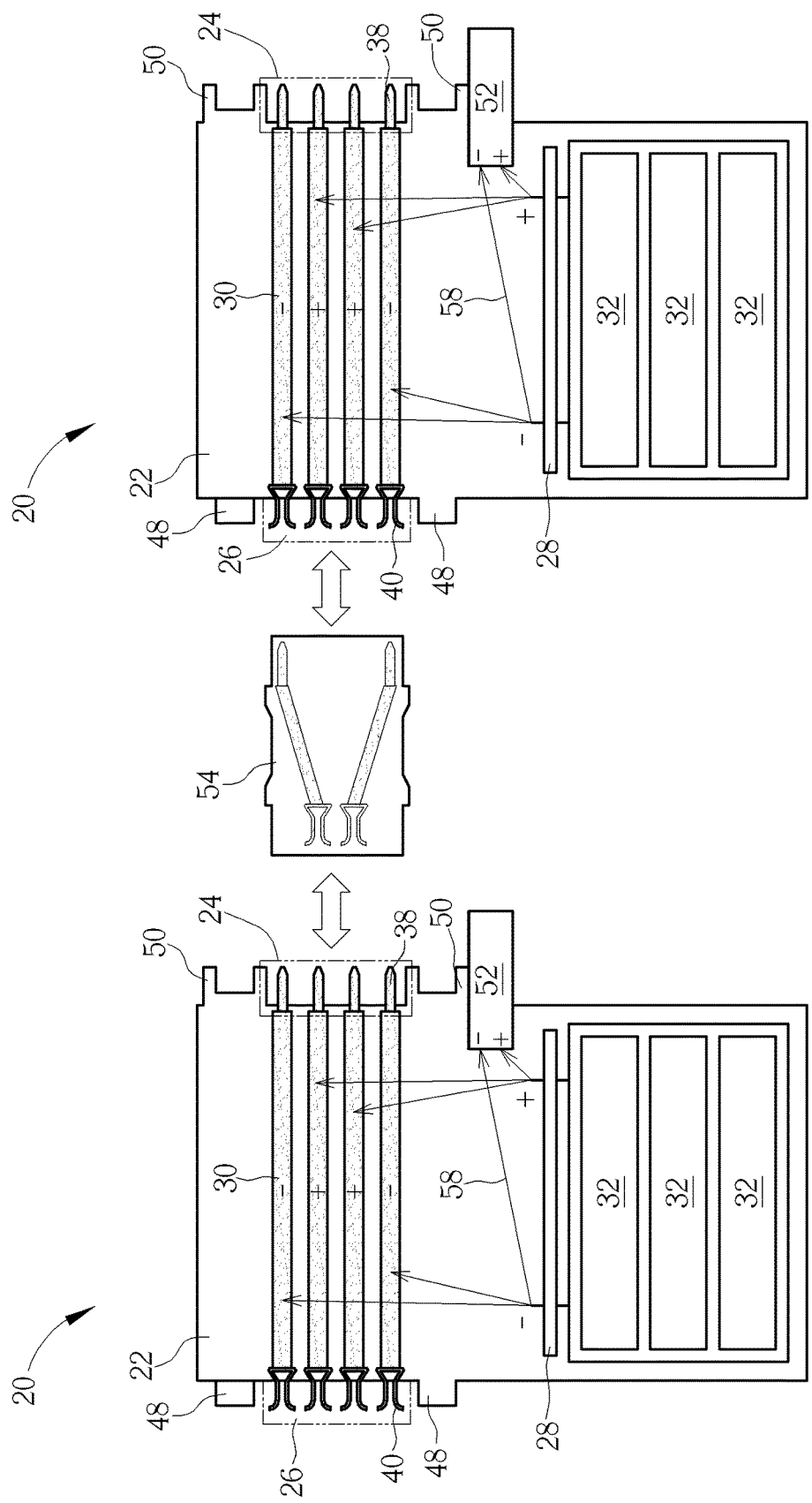
FIG. 6 is a diagram illustrating the plurality of the electrical energy storage device of FIG. 2 connected in series connection by an electricity conducting module for in-series connection according to an embodiment of the present disclosure.

The plurality of first clamping male terminals 38 of one of the electrical energy storage devices 20 can be inserted into the plurality of second clamping female terminals 40 of the adjacent one of the electrical energy storage devices 20 to establish current transmission channel between the electrical energy storage devices 20. The plurality of electrical energy storage devices 20 may be connected with each other in series and/or in parallel to form an electrical energy storage assembly. Therefore, thickness and areas of the clamping portions of the first clamping male terminal 38 and the second clamping female terminal 40 may be preferably increased to provide excellent electrical conductivity and efficient heat dissipation so as to decrease the temperature of the electrical energy storage assembly during charging and discharging, and to enhance convenience and safety during assembling. In other embodiments, the electricity conducting module for in-series connection 54 may be designed for an application of establishing an in-series connection between these electrical energy storage devices 20, as shown in FIG. 6.

Figure 7:
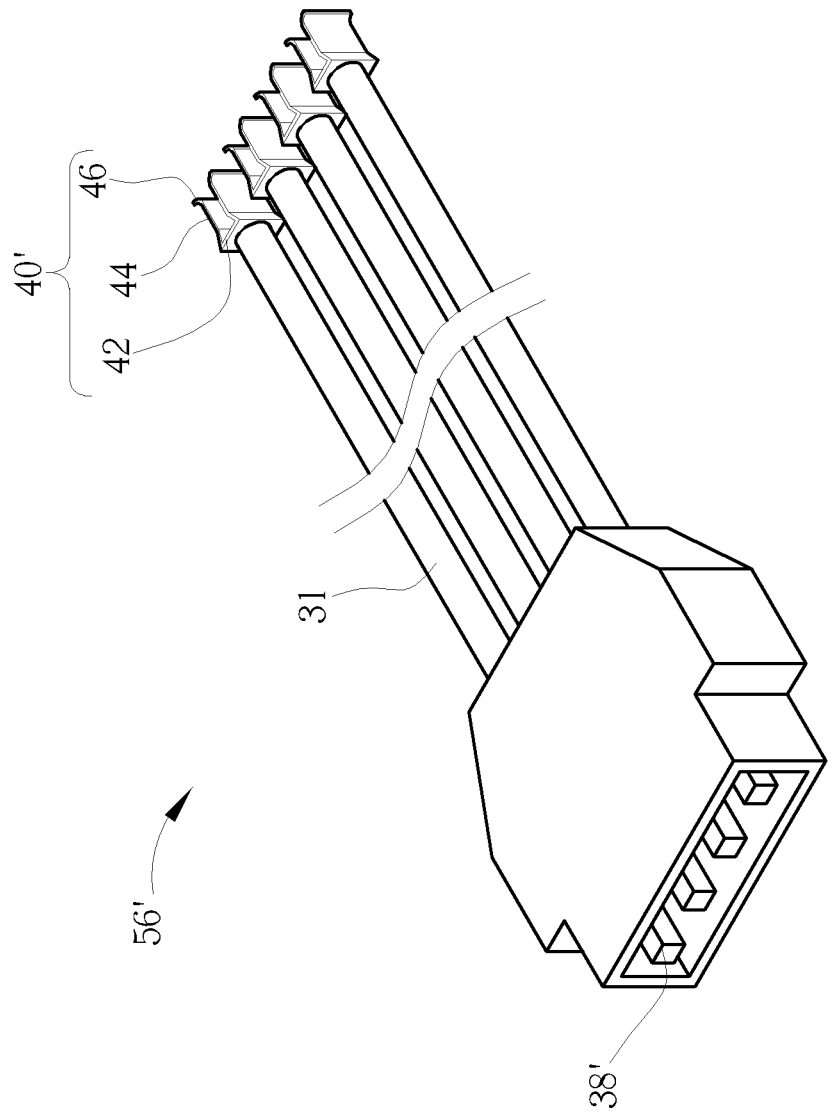
FIG. 7 and FIG. 8 are diagrams respectively illustrating another two different terminal shapes of the electricity conducting module for in-parallel connection of FIG. 5 according to other embodiments of the present disclosure.
Figure 8:
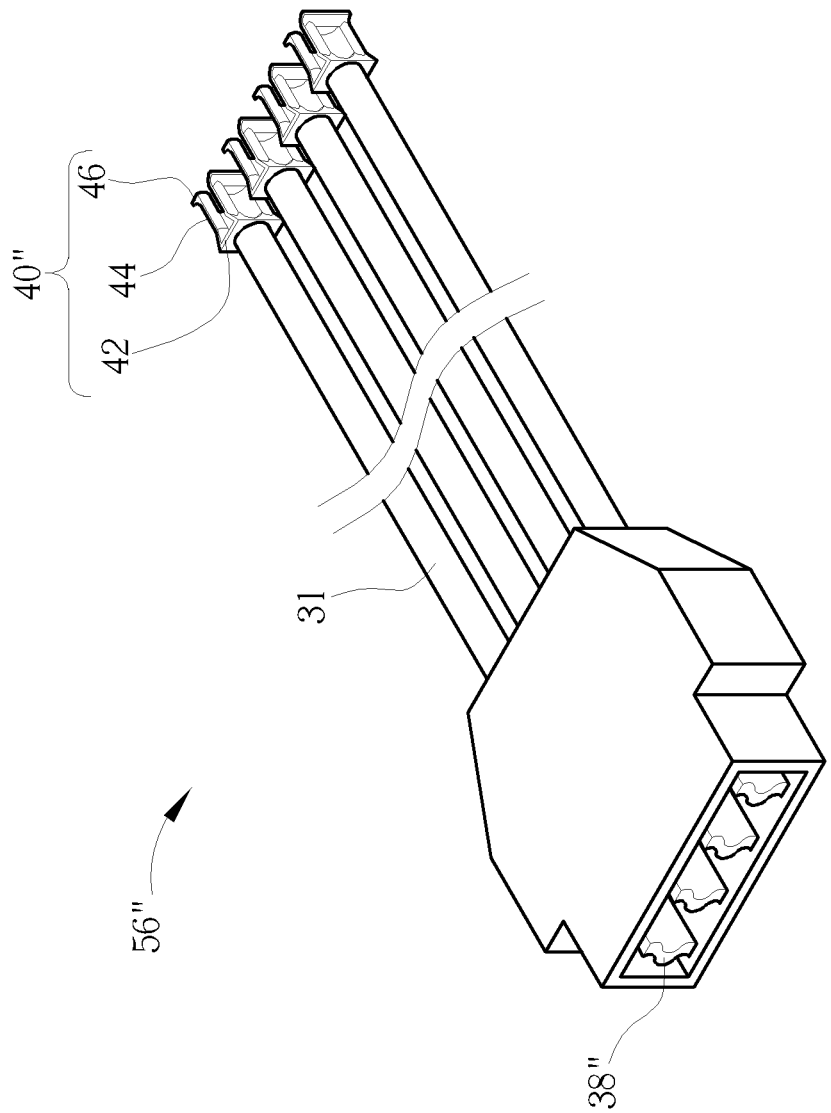

As shown in FIG. 7, the electricity conducting module for in-parallel connection 56' has the first clamping male terminal 38' and the second clamping female terminal 40' disposed respectively on two opposite ends of the conductive component 31, wherein the first clamping male terminal 38' can be a sheet-like structure or a cube-like structure, and the second clamping female terminal 40' is a corresponding structure. As shown in FIG. 8, another electricity conducting module for in-parallel connection 56" has the first clamping male terminal 38" and the second clamping female terminal 40" disposed respectively on two opposite ends of the conductive component 31, wherein the first clamping male terminal 38" is a wavy structure and the second clamping female terminal 40" is a wavy structure corresponding to the wavy structure of the first clamping male terminal 38". Shapes of the clamping male/female terminals may be designed differently and utilized to increase contact area between clamping portions of a male terminal and a female terminal, and are therefore not limited to the above-mentioned embodiments.

In embodiments, the first clamping male terminal 38 may have the planar structure, the sheet-like structure, the circular structure, the slab-like structure, or the pillar-like structure. The second clamping female terminal 40 may have a letter Y-like structure, and a clamping portion of the second clamping female terminal 40 may have a structure formed to be engaged with the planar structure, the sheet-like structure, the circular structure, the slab-like structure or the pillar-like structure of the first clamping male terminal 38.

Figure 5:
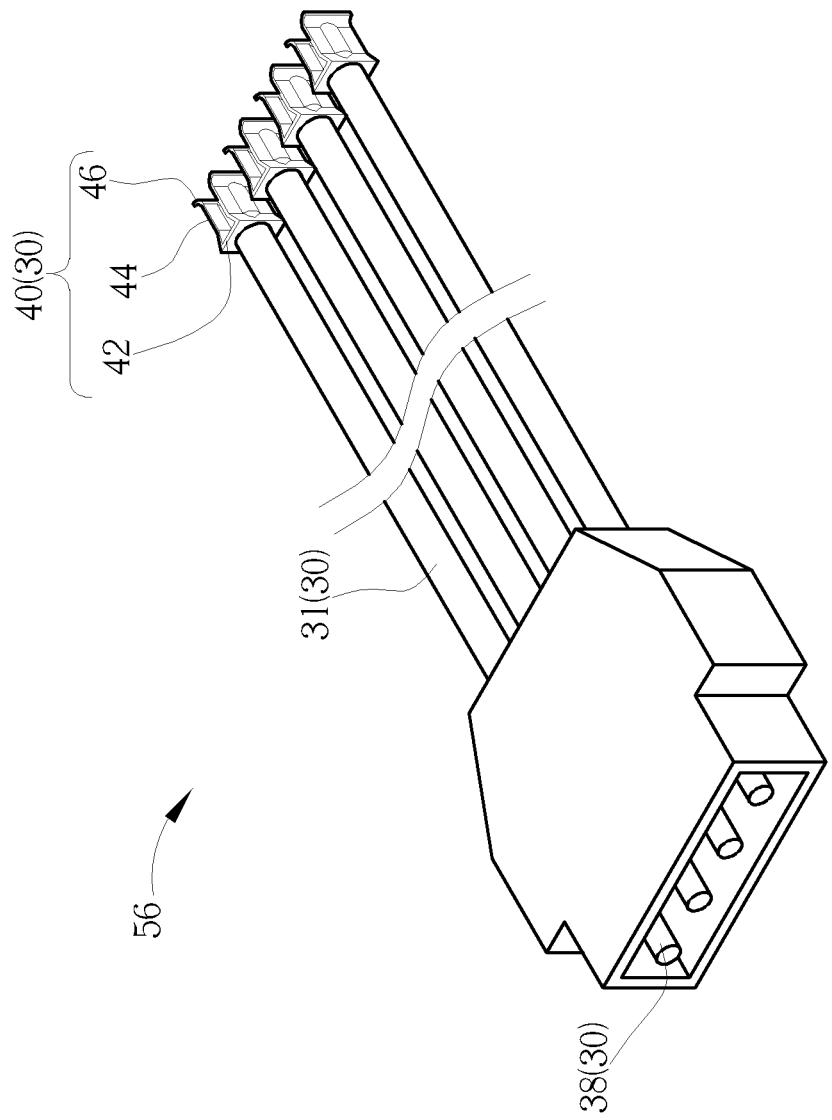
FIG. 5 is a diagram illustrating an electricity conducting module for in-parallel connection of the electrical energy storage device of FIG. 2 according to an embodiment of the present disclosure.

Referring to FIG. 5, the second clamping female terminal 40 mainly includes, but not limited to, a bottom portion 42, a clamping portion 44 and a inclined guiding portion 46, wherein two ends of the clamping portion 44 may be connected to the bottom portion 42 and the inclined guiding portion 46, respectively. The inclined guiding portion 46 is a front part of the letter Y-like structure, and the bottom portion 42 is a rear part of the letter Y-like structure. The clamping portion 44 is a middle part of the letter Y-like structure to provide an obviously better larger clamping area than that of a typical letter M-like clamper whose point-contact or linear-contact limited clamping portion may rapidly cause high temperature increase during higher current transmission. The clamping portion 44 may be resiliently widened relative to the bottom portion 42, and adapted to press tight against the first clamping male terminal 38 of the other electrical energy storage device 20 in an area contacting manner. In this way, a contact area between the clamping portion 44 of a second clamping female terminal 40 of an electrical energy storage device 20 and the first clamping male terminal 38 of the other electrical energy storage device 20 could be increased, so as to increase the transmission efficacy and the current volume and to effectively minimize the temperature increase for preventing overheating. The inclined guiding portion 46 provides an opening with a wide front end and a narrow rear end. The inclined guiding portion 46 is utilized to guide insertion of the first clamping male terminal 38 of the other electrical energy storage device 20 into the second clamping female terminal 40, and then allows the clamping portion 44 to clamp the first clamping male terminal 38 with a big area contact.

Moreover, referring to FIG. 4, an electrical energy storage device 20 may include a first engaging component 48 and a second engaging component 50 disposed on two opposite sides of the casing 22, respectively. The first engaging component 48 and the second engaging component 50 are designed to engage each other such that a plurality of electrical energy storage devices 20 could be assembled easily and firmly. When the two adjacent electrical energy storage devices 20 are assembled with each other by engagement of the first engaging component 48 and the second engaging component 50, the plurality of first clamping male terminals 38 of one electrical energy storage device 20 would be meantime engaged with the plurality of second clamping female terminals 40 of the other electrical energy storage device 20. Therefore, the two electrical energy storage devices 20 could be firmly assembled through this mechanical positioning. As shown in the above figures, a plurality of electrical energy storage devices 20 can be assembled in a parallel connection via the plurality of first clamping male terminals 38 and the plurality of second clamping female terminals 40.

In other embodiments, referring to FIG. 6, the electricity conducting module for in-series connection 54 may be used to assemble several electrical energy storage devices 20 in a series connection. The electricity conducting module for in-series connection 54 is a mechanical device designed for the series connection of the electrical energy storage devices 20.

The electricity conducting module for in-series connection 54 may be a cable or a plug, which is applied with the electricity conduction mechanism and has the internal wires and terminals to connect the positive terminals of one electrical energy storage device 20 with the negative terminals of another electrical energy storage device 20, for series connection. The electricity conducting module for in-series connection 54 may properly adjust voltage variation of an electrical energy storage assembly, increase electric quantity and expand power capacity of the electrical energy storage assembly, and effectively minimize the temperature increase. The electricity conducting module for in-series connection 54 may be used independently or collaboratively with the plurality of first clamping male terminals 38 and the plurality of second clamping female terminals 40 in other embodiments for series connection. In other embodiments, the electricity conducting module for in-series connection 54 may further have a conduction switch operated by a user to control either to raise voltage of an electrical energy storage assembly of these electrical energy storage devices 20, or to charge and discharge the electrical energy storage assembly in its original status.

In one embodiment, the electrical energy storage device 20 may optionally include a unidirectional DC charging port 52 disposed on the casing 22 and electrically connected to the electrical energy storage unit 32 via the protection circuit board 28. The protection circuit board 28 is electrically connected to the unidirectional DC charging port 52 by a third transmission cable 58. The unidirectional DC charging port 52 is utilized to transmit a power signal from an external apparatus into the electrical energy storage device 20. In this case, the protection circuit board 28 may be used to detect three sources of power signals, including one transmitted from the input terminal set 24, one transmitted from the external apparatus via the unidirectional direct current charging connector 52, and one transmitted from the electrical energy storage unit 32. The protection circuit board 28 detects parameters including voltages and/or currents of these three power signals, and performs voltage control function to adjust flow direction and volume of the power signal, that performs to avoid short-circuit of the electrical energy storage device 20, or overheating etc.

In one embodiment, a DC power supply device (which can be an adapter) may be used to charge the electrical energy storage device 20 with city power, and the adapter may be provided with an indicator to allow manually or automatically cut-off the power supply when the electrical energy storage device 20 is charged or discharged to a predetermined voltage. Therefore, the electrical energy storage device 20 would have extended service life and expanded range of application. The indicator may be a light in a power supply device with city power, with a kinetic green energy generator, wind power generator, solar energy generator and even fossil energy generator, and the indicator may be another light to guide the user to manually stop discharging the electrical energy storage device 20, or to indicate that the protection circuit board 28 has activated protection mechanism for discharging when the electrical energy storage device 20 is discharged to a predetermined voltage.

In another embodiment, the electrical energy storage device 20 may be effectively used for power storage with a clean energy generator, such as a kinetic generator, a wind power generator, a solar power generator, and/or a fossil energy generator, so that the user can obtain and store power energy in regions where normal power facilities are short or unavailable.

In the present disclosure, detecting instruments are utilized to select the electrical energy storage units 32 having internal impedance coefficients within a specific range, preferably within a difference of 0.15 mΩ, and then connect each other in series and/or in parallel to form an electrical energy storage device 20. Moreover, a plurality of the electrical energy storage devices 20 having the internal impedance coefficients within the specific range further can be assembled in series and/or in parallel to form an integrated larger electrical energy storage assembly. The electricity conducting mechanism 30 is disposed between the input terminal set 24 and the output terminal set 26 of the electrical energy storage device 20 to establish the direct current guiding channel. Parameter difference of the power signals among the plurality of electrical energy storage devices 20 activates transmission of the power signal flowing into (charging) and flowing out of (discharging) the electrical energy storage unit 32 through the dynamic auto-balancing interface of the electricity conducting mechanism 30 in accordance with the voltage control function performed by the protection circuit board 28. Therefore, each electrical energy storage device 20 of the electrical energy storage assembly shares a common balanced and stable voltage/current is ensured, and the electrical energy storage assembly acts just like as a single battery.

Moreover, a certain electrical energy storage device 20 having lowest voltage or the worst quality inside the energy storage assembly could be prevented from being prior ones charged and/or discharged. The letter Y-like second clamping female terminals 40 and the first clamping male terminals 38 with the sheet-like structure are respectively disposed on two ends of the electricity conducting mechanism 30, and the clamping portion 44 of the second clamping female terminals 40 provides a larger contact area than that of a typical letter M-like terminal. The letter Y-like structure of the second clamping female terminals 40 further has advantages of saving materials, easy plug in and draw, and effectively dissipating heat to minimize the temperature, so as to guarantee the convenience and safety of the electrical energy storage device 20.

The electricity conducting mechanism 30 of the present disclosure is a new conducting mechanism with the letter Y-like terminal having area contacting and may be further applied with other related electricity conducting modules. The electricity conducting mechanism 30 performs function of dynamic voltage auto-balancing by building a direct voltage/current guiding channels for power signals (or conducted currents) transmitted freely in physics way from a higher voltage level to a lower voltage level at all times among the electrical energy storage devices 20 no matter what situation the assembly of the electrical energy storage devices 20 are, such like including charge/discharge, charge, discharge, non-charge/non-discharge, and in series/parallel connection with other energy storage devices 20. The function of dynamic voltage auto-balancing automatically actuates in a short time since the electrical energy storage devices 20 are connected with each other to be integrated so as to act as a single battery. Compared with the typical energy storage device, the electrical energy storage device 20 utilizes the electricity conducting mechanism 30 rather than an expensive electronic central controller to balance the voltages/currents among the plurality of electrical energy storage devices 20. Even when an extra electrical energy storage device 20 is further connected to an existing energy storage assembly, the function of dynamic voltage auto-balancing still automatically actuates between the extra electrical energy storage device 20 and the existing energy storage assembly by means of the direct current guiding channel established by the electricity conducting mechanism 30, and all of the electrical energy storage devices 20 of the newly assembled energy storage assembly connected in series and/or in parallel rapidly reach a voltage and electricity balanced status as a single large scale battery.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electricity conducting mechanism of an electrical energy storage device having a casing with an input terminal set and an output terminal set respectively at two opposite sides of the casing, being provided inside with a protection circuit board to perform function of controlling voltages thereof, and being provided inside with at least one electrical energy storage unit electrically connected to the protection circuit board, the electricity conducting mechanism comprising:

a first clamping terminal disposed in the input terminal set;

a second clamping terminal disposed in the output terminal set, structures of the first clamping terminal and the second clamping terminal being shaped to fitly engage with each other; and a conductive component having two opposite ends extended into the input terminal set and the output terminal set and therefore respectively connected to the first clamping terminal and the second clamping terminal, and the conductive component being connected to the electrical energy storage unit via the protection circuit board; wherein when two of electrical energy storage devices are connected, the first clamping terminal of one of the electrical energy storage devices is engaged with the second clamping terminal of the other of the electrical energy storage devices, and the electricity conducting mechanism performs function of dynamic voltage auto-balancing based on physical flow of voltages until voltages of all the electrical energy storage devices reach a constant value, and voltage differences between the electricity conducting mechanism and the electrical energy storage unit and current volumes are detected and controlled by the protection circuit board.

2. The electricity conducting mechanism of claim 1, wherein the first clamping male terminal disposed in the input terminal set receives a power signal and directly transmits a received power signal to the second clamping female terminal disposed in the output terminal set via the conductive component.

3. The electricity conducting mechanism of claim 1, wherein the conductive component, the first clamping male terminal and the second clamping female terminal have high heat durability, high electrical conductivity and high power durability.

4. The electricity conducting mechanism of claim 1, wherein an amount, a length, a width and a thickness of the conductive component, the first clamping male terminal and the second clamping female terminal are defined in accordance with an amount of the electrical energy storage unit inside the electrical energy storage device and an amount of the electrical energy storage device in connection.

5. The electricity conducting mechanism of claim 1, wherein when more than two of the electrical energy storage devices are connected, the electricity conducting mechanism performs to distribute dynamically corresponding voltages and currents from ones of the electrical energy storage devices to other electrical energy storage devices based on the power signals transmitted among the electrical energy storage devices via the control of the protection circuit board.

6. The electricity conducting mechanism of claim 1, wherein the second clamping female terminal comprises:
    a bottom portion;
    a clamping portion having one end connected to the bottom portion, adapted to press against a corresponding first clamping male terminal in an area contacting manner, the clamping portion having a structure selected from a group consisting of a sheet-typed structure, a pillar-typed structure and other more structures; and
    an inclined guiding portion connected to the other end of the clamping portion and adapted to guide the corresponding first clamping male terminal to contact against the clamping portion.

7. The electricity conducting mechanism of claim 6, wherein the second clamping female terminal has a letter Y-like structure, the bottom portion is a rear part of the letter Y-like structure, the inclined guiding portion is a front part of the letter Y-like structure, and the clamping portion is a middle part of the letter Y-like structure, the clamping portion the second clamping female terminal contains an area to maximize the contact surface with the first clamping male terminal.

8. An electrical energy storage device, comprising:
    a casing;
    an input terminal set disposed on one side of the casing;
    an output terminal set disposed on the other side of the casing;
    at least one electrical energy storage unit provided inside the casing;
    a protection circuit board provided inside the casing to perform at least voltage control function;
    an electricity conducting mechanism, comprising:
        a first clamping terminal disposed in the input terminal set; and
        a second clamping terminal disposed in the output terminal set, structures of the first clamping terminal and the second clamping terminal being shaped to fitly engage with each other; and
    a conductive component having two opposite ends extended into the input terminal set and the output terminal set and therefore respectively connected to the first clamping terminal and the second clamping terminal, and the conductive component being connected to the electrical energy storage unit via the protection circuit board; wherein when two of electrical energy storage devices are connected, the first clamping terminal of one of the electrical energy storage devices is engaged with the second clamping terminal of the other of the electrical energy storage devices, and the electricity conducting mechanism performs function of dynamic voltage auto-balancing based on physical flow of voltages until voltages of all the electrical energy storage devices reach a constant value, and voltage difference between the electricity conducting mechanism and the electrical energy storage unit and current volumes are detected and controlled by the protection circuit board.

9. The electrical energy storage device of claim 8, wherein power signals received by the input terminal set, an unidirectional DC charging port, and the electrical energy storage unit are directly transmitted to the output terminal set, or transmitted into or out of the electrical energy storage unit by performing the function of dynamic auto-balancing voltages and currents controlled by the protection circuit board through the electricity conducting mechanism, so as to make all of the electrical energy storage devices in assembly reaching a balanced voltage within a specific range.

10. The electrical energy storage device of claim 8, wherein the electrical energy storage unit in the one of the electrical energy storage devices and the electrical energy storage unit in the other of the electrical energy storage devices have similar parameter specification within a specific range.

11. The electrical energy storage device of claim 8, wherein a plurality of the electrical energy storage units having approximate internal impedance coefficient within a specific range are disposed inside the casing.

12. The electrical energy storage device of claim 8, wherein a plurality of the first clamping male terminals and a plurality of the second clamping female terminals are provided, and the plurality of the first clamping male terminals comprises at least one input positive terminal and at least one input negative terminal while the plurality of the second clamping female terminals comprises at least one output positive terminal and at least one output negative terminal.

13. The electrical energy storage device of claim 8, wherein the protection circuit board is electrically connected to the electricity conducting mechanism, and an unidirectional DC charging port and the electrical energy storage unit, the first clamping male terminal and the second clamping female terminal of the electricity conducting mechanism are electrically connected to the electrical energy storage unit via the protection circuit board.

14. The electrical energy storage device of claim 8, wherein the protection circuit board is electrically connected to the electricity conducting mechanism via a first transmission cable, electrically connected to the electrical energy storage unit via a second transmission cable, and electrically connected to an unidirectional DC charging port via a third transmission cable, so as to detect power signals of the electricity conducting mechanism, the electrical energy storage unit and the unidirectional DC charging port, and therefore performs the voltage control function to execute charging and discharging function of the electrical energy storage device through the first transmission cable and the second transmission cable.

15. The electrical energy storage device of claim 14, wherein the third transmission cable is used only to execute charging function.

16. The electrical energy storage device of claim 8, wherein the protection circuit board is electrically connected to the electrical energy storage unit via a single transmission cable, and a maximal charging current preset by the protection circuit board does not exceed 0.5C till the electrical energy storage unit is full loaded to a preset current cut-off limit, and a maximal discharging current preset by the protection circuit board does not exceed 2C till the electrical energy storage unit is electrically discharged to a preset current limit, the protection circuit board actuates charging and discharging protection within 30 milliseconds.

17. The electrical energy storage device of claim 16, wherein the protection circuit board is electrically connected to the electrical energy storage unit via a transmission cable having two unidirectional sub-wires, one of the sub-wires is utilized to execute charging function while the other sub-wire is utilized to execute discharging function.

18. The electrical energy storage device of claim 8, further comprising:
   an unidirectional DC charging port electrically connected to the electricity conducting mechanism and the electrical energy storage unit via the protection circuit board.

19. The electrical energy storage device of claim 8, wherein the electricity conducting mechanism refers to voltages and currents of a power signal of one of the electrical energy storage devices, dynamically controls the voltages and currents via the protection circuit board, and distributes another power signal with corresponding voltages and currents to the other electrical energy storage device in accordance with the voltage difference.

20. The electrical energy storage device of claim 8, further comprising:
   a first engaging component disposed on one side of the casing; and
   a second engaging component disposed on the other side of the casing;
   wherein the second engaging component of one of the electrical energy storage devices is correspondingly engaged with the first engaging component of the other of the electrical energy storage devices.

21. The electrical energy storage device of claim 8, wherein the input terminal set is structured as a recess formed on the casing to accommodate the first clamping male terminal and the output terminal set of the other electrical energy storage device.

* * * * *